UNITED STATES PATENT OFFICE.

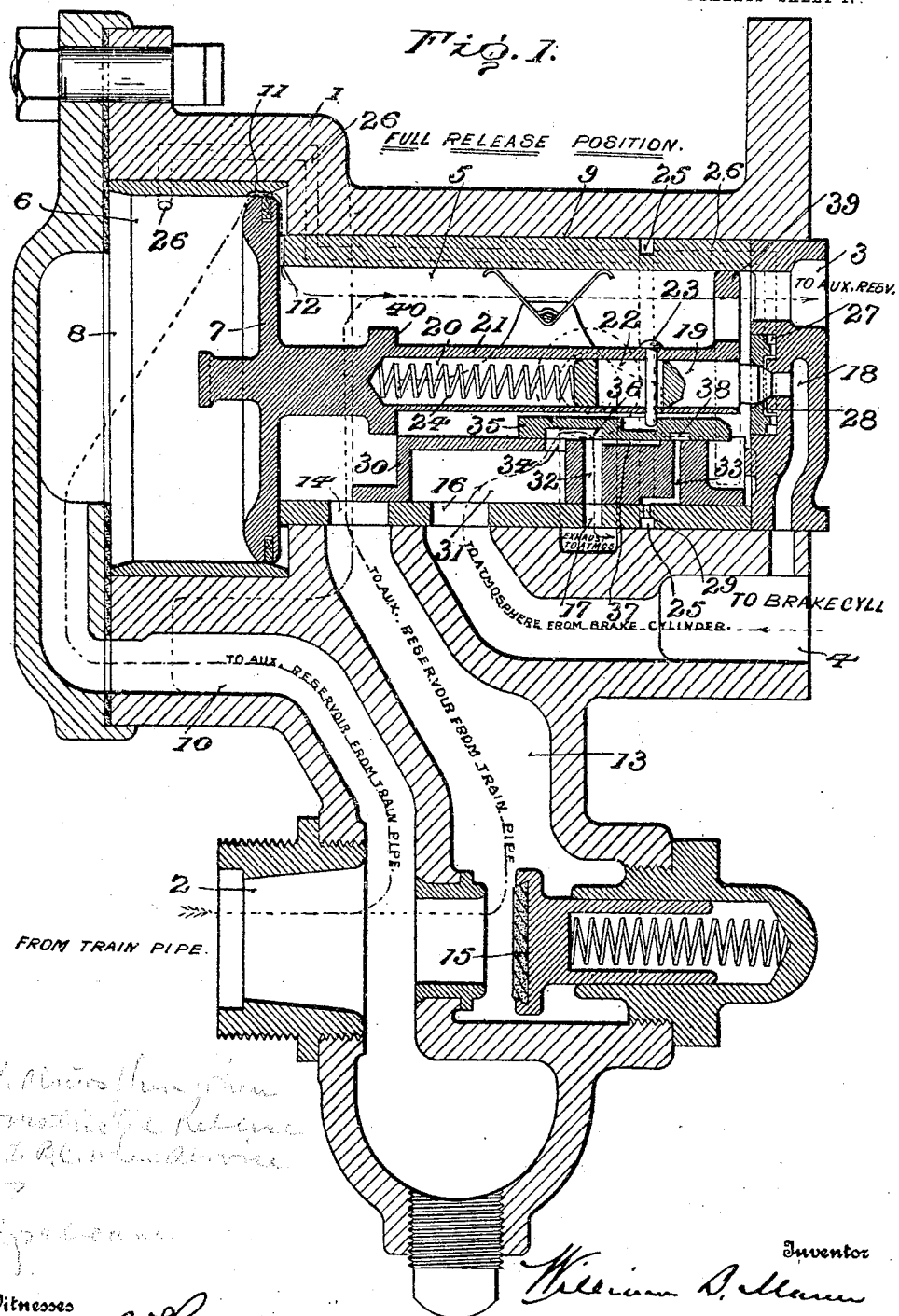

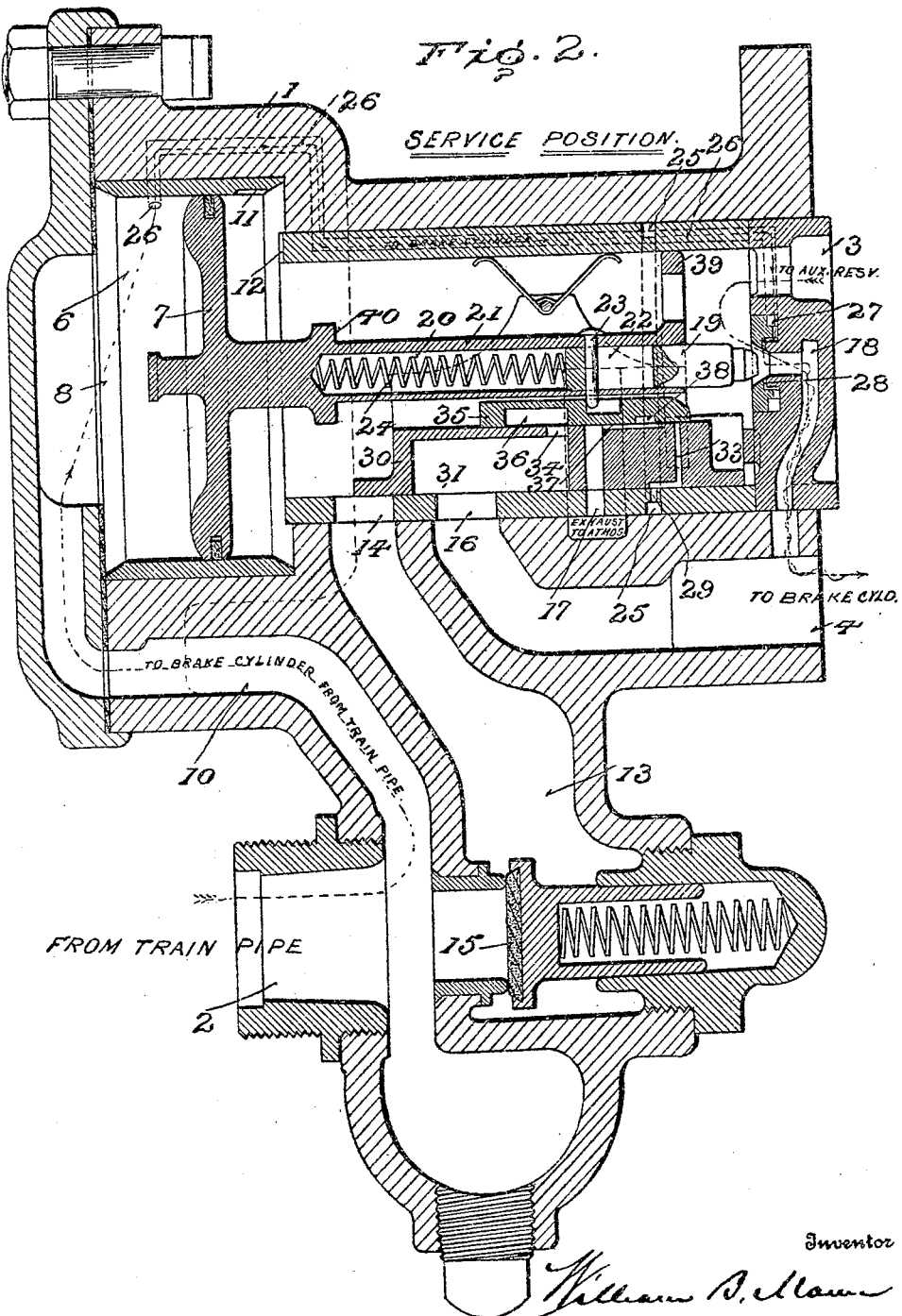

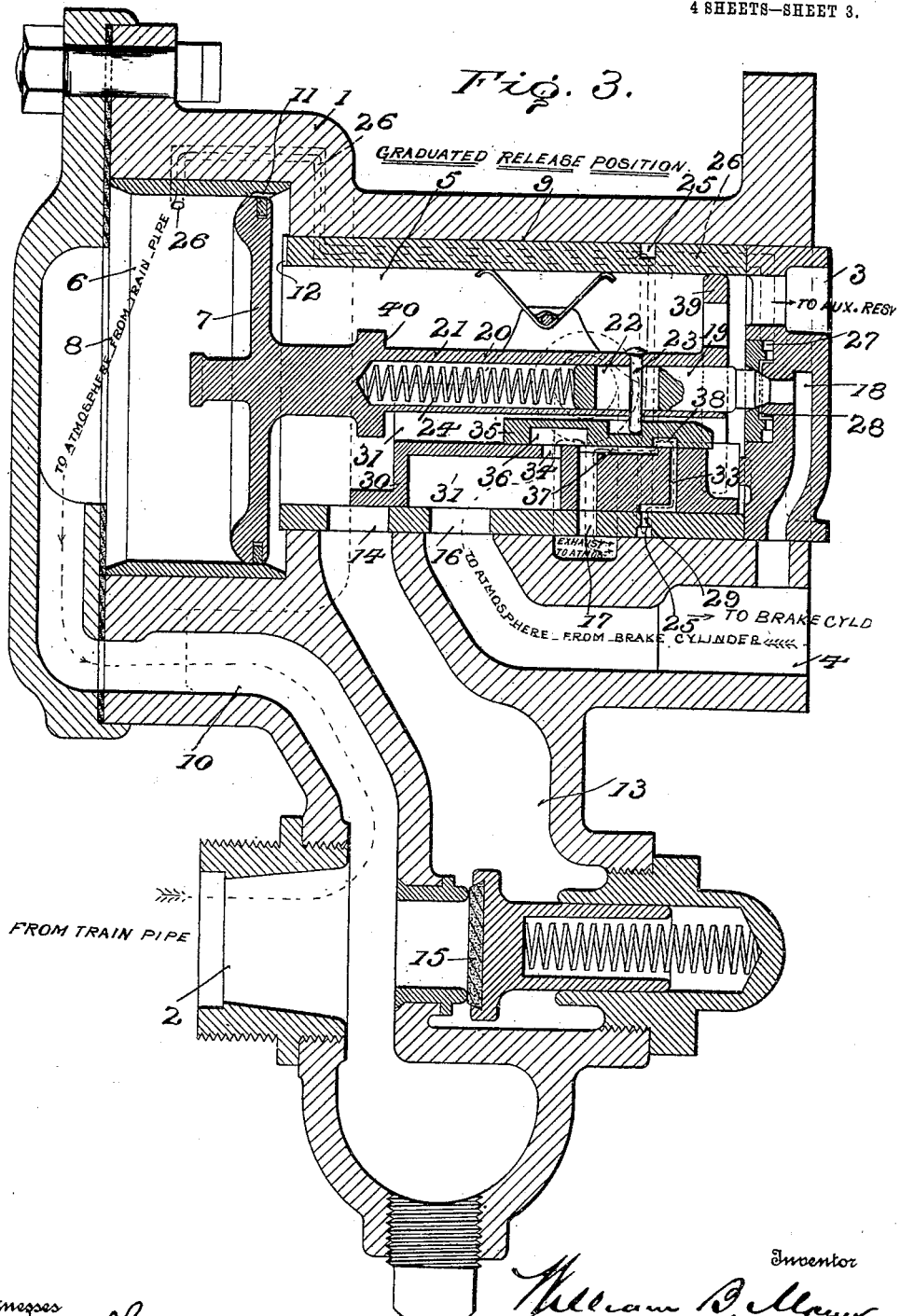

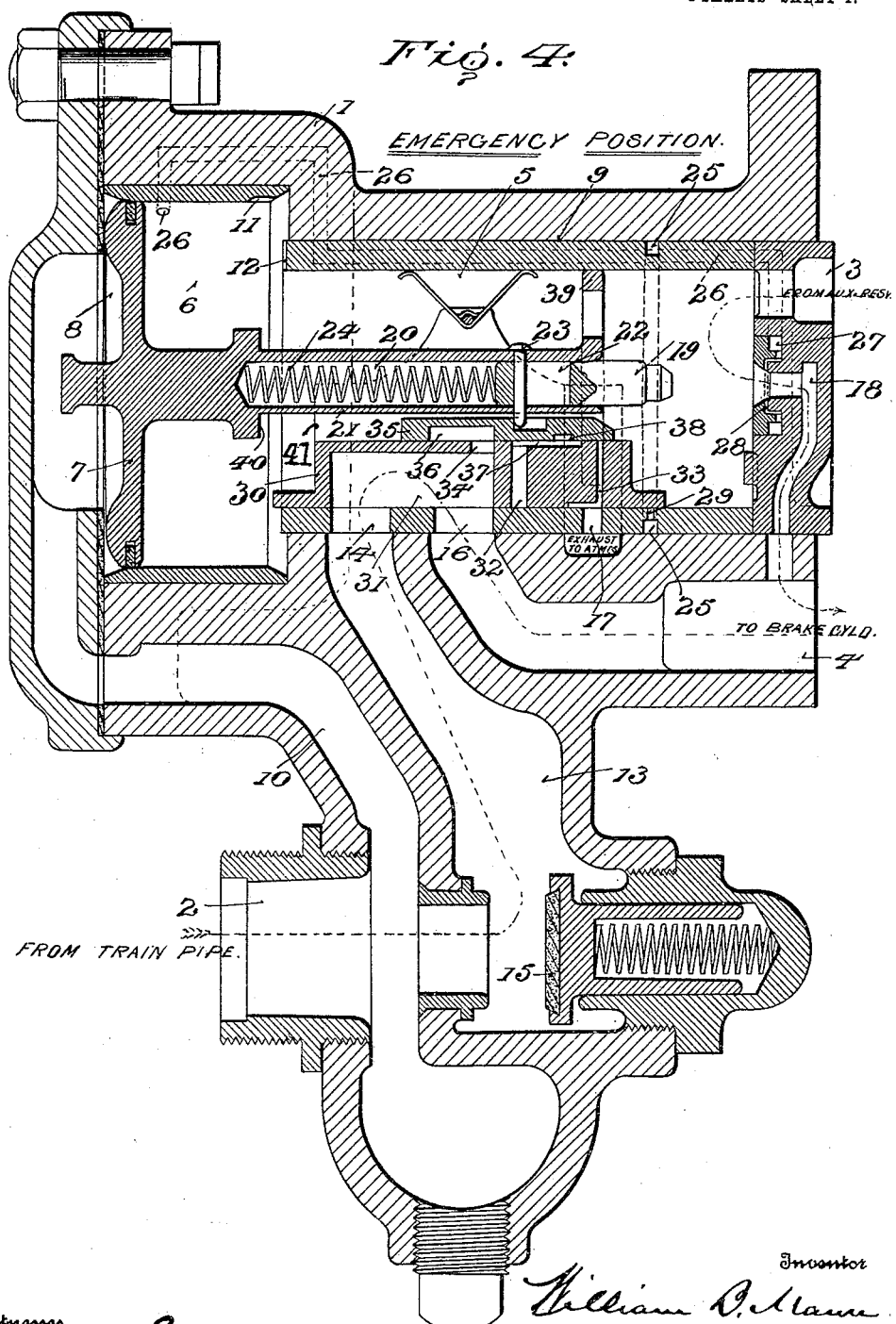

WILLIAM BRAYTON MANN, OF BALTIMORE, MARYLAND, ASSIGNOR TO PHILIP MAURO AND S. T. CAMERON, TRUSTEES, BOTH OF WASHINGTON, DISTRICT OF COLUMBIA.

TRIPLE VALVE FOR AIR-BRAKES.

931,942.  Specification of Letters Patent.  Patented Aug. 24, 1909.

Application filed November 9, 1907. Serial No. 401,533.

*To all whom it may concern:*

Be it known that I, WILLIAM B. MANN, of Baltimore, Maryland, have invented a new and useful Triple Valve for Air-Brakes, which invention is fully set forth in the following specification.

This invention relates to triple valves for air-brakes, and has for its object to provide a valve of this character which shall perform all the functions of admitting air from the train-pipe to the auxiliary-reservoir for charging the latter; admitting air from the auxiliary-reservoir to the brake-cylinder in moderated or graduated quantities for ordinary service applications of the brakes, and in full volume for emergency applications of the brakes, in which latter case the quick serial action of all the valves on the train may be secured by a serial discharge of train-pipe air direct to the brake-cylinder; and in addition to the above features, shall perform the desirable function of enabling the engineer to effect a graduated release of the brakes. This latter function is particularly desirable where, during the service application of the brakes, it is required to lessen the amount of braking pressure in the brake-cylinder without entirely relieving the same, and particularly is it desirable to effect this release of pressure in the brake-cylinder in graduated quantities.

A valve performing the functions above designated is particularly desirable for short trains, such as in the passenger service and upon electric cars having from one to ten cars in the train.

With the afore-mentioned object in view, the invention consists of a valve-casing communicating with the train-pipe, the auxiliary-reservoir and the brake-cylinder respectively, as is usual in such structures, and having a valve-operating piston operatively connected to a graduating valve which controls the passage of air from the auxiliary-reservoir to the brake-cylinder, and a main valve controlling the passage of air from the train-pipe to the brake-cylinder, from said pipe to the auxiliary-reservoir, and from the brake-cylinder to the atmosphere, when it is desired to release the brakes, said main valve acting in conjunction with a secondary-valve which controls the release ports through the main-valve and also controls a port or passage-way from the train-pipe to the atmosphere, which passage-way can be restrictedly placed in communication with the atmosphere when the engineer desires to effect a graduated release of the brakes. During the service application of the brakes this passage-way leading from the train-pipe is also placed in communication with the brake-cylinder. The communication between said train-pipe passage and the atmosphere is controlled, as above intimated, by the secondary or release-valve operating in conjunction with the main-valve; while, on the other hand, the communication of the train-pipe passage-way with the brake-cylinder is controlled by the graduating-valve.

The inventive idea involved is capable of receiving a variety of mechanical expressions, one of which, for the purpose of illustration, is shown in the accompanying drawings; in which—

Figure 1 is a vertical longitudinal section through the triple-valve and its casing, with the parts in full-release position; Fig. 2 is a like view showing the parts in service position, that is, in the act of permitting braking-air to pass from the auxiliary-reservoir to the brake-cylinder, and train-pipe air to pass from the train-pipe to the brake-cylinder; Fig. 3 is also a vertical longitudinal section, with the parts in the position which they assume to effect graduated release of the brakes, in which position there is a restricted passage leading from the brake-cylinder to the atmosphere, and like-wise a restricted passage leading from the train-pipe to the atmosphere. Fig. 4 is a section similar to the other figures, but with the parts in emergency position, the train-pipe air passing directly from the train-pipe to the brake-cylinder, and auxiliary-reservoir air passing in full volume also to the brake-cylinder.

Referring to the several views, in which like numerals designate like parts, 1 is a valve-casing having a port 2 leading thereinto from the train-pipe, a port 3 communicating with the auxiliary-reservoir, and a port 4 communicating with the brake-cylinder. Within this casing is the valve-chamber 5 and the piston-cylinder 6, within which latter plays valve-operating piston 7 of usual or any suitable construction, the cylinder 6 being lined with bushing 8 and valve-casing 5 being lined with bushing 9. Between the train-pipe port 2 and the cylinder 6 is the passage-way 10 by which train-pipe air is conducted directly to cylinder 6 to the rear of piston 7. The usual leak-in port 11 is provided around the piston 7 from the train-pipe side thereof, while the port 12 in the end of bushing 9 permits air to pass via the port 11 and the port 12 from the train-pipe side of the piston 7 to the auxiliary reservoir side thereof. In the lower part of the casing 1 is channel 13, also leading from the train-pipe to the interior of valve-chamber 5 by way of port 14. This passage 13 is controlled by spring-pressed valve 15. There is also a port 16 leading from the valve-chamber 5 to the brake-cylinder passage 4, and a port 17 leading from the valve-chamber to the atmosphere, while a passage 18 leads from the auxiliary-reservoir to brake-cylinder passage 4, which passage is controlled by the graduating valve 19 mounted in a counterbore 20 of the piston-stem 21. The graduating valve 19 has a vertical slot 22 therein, through which passes a pin 23 carried by the piston-stem, the lower end of said pin projecting from the under-side of the piston-stem 21. Interposed between the rear of the graduating-valve 19 and the piston-stem is a light spring 24 which is under more or less compression when the parts are in the full-release position shown in Fig. 1. An annular groove 25 is formed in the bushing 9 which lines the valve-chamber 5, and this annular groove is in direct communication with the train-pipe through a passage 26 formed partly in the walls of the casing 1 and partly in the walls of the bushing 9, said passage 26, however, extending from the train-pipe past the groove 25 and communicating with an annular groove 27, which is directly connected to passage 18 by ports 28, which ports 28 are closed when the graduating-valve 19 is seated, as shown in Figs. 1 and 3, but which are open when the valve is lifted from its seat, as shown in Figs. 2 and 4. The annular groove 25 is in direct communication with the interior of the valve-chamber 5 by a port 29.

Within the valve-chamber 5 is a main slide-valve 30, having a chamber 31, a vertical passage or port 32, and a passage 33 extending partly in a vertical and partly in a horizontal direction. When the parts are in full-release position, the chamber 31 in said main-valve registers with the brake-cylinder release-port 16, the vertical passage 32 in said main-valve registers with the exhaust-port 17, and the passage 33 in said valve registers with the port 29 leading from the annular groove 25. The main-valve 30 is also provided with a port 34 leading from the chamber 31 outward through the top of said valve, and resting upon the top of the main slide-valve is an exhaust-valve 35 provided with a chamber 36, which, when the parts are in full-release position, registers with ports 32 and 34, thereby placing the brake-cylinder in direct communication with the atmosphere. This slide-valve 35 has in its upper portion a slot or groove within which plays the lower projecting end of pin 23 carried by the piston valve-stem 21. Formed in the upper portion of the main slide-valve 30 and communicating at one end thereof with the port 32 is channel or groove 37 extending from said port 32 nearly but not quite to port 33, and in the under side of the slide-valve 35 there is formed a small chamber 38 whose extent is sufficient to afford a restricted communication between the port 33 and the channel 37 when the parts are placed in proper position for effecting the graduated release, such position being shown in Fig. 3.

The main-valve is operated by means of the spider 39 on the end of the valve-stem 21 to move in one direction, and by the engagement of the shoulder 40 on the valve-stem with the rear end 41 of said main-valve, as is usual in such structures.

It will be observed that the parts are so proportioned that there may be some relative movement between the piston-stem and the main-valve; between the piston-stem and the release-valve; and between the piston-stem and the graduating-valve; and moreover, that the main-valve and the release-valve may move with relation to each other, and that both the release-valve and the graduating-valve may be moved without imparting movement to the main-valve.

The port 33, it will be observed, when the parts are in the position shown in Fig. 3, permits the passage of train-pipe air to the atmosphere simultaneously with the restricted passage of brake-cylinder air via the port 32 to the atmosphere. This port 33 is preferably the same or approximately the same size as the port in the engineer's-valve which permits train-pipe pressure to pass from the main-reservoir to the train-pipe for the purpose of releasing the brakes.

*Operation.*

*Full-release.*—With the parts in full-release position, as shown in Fig. 1, air passes directly from the brake-cylinder to the atmosphere via the main-valve, the chamber 36 in the release-valve 35, and the port 32 in the main-valve, while the port 33 leading from the train-pipe is closed by the release-valve, and the auxiliary-reservoir passage 18 is closed by the seating of the graduating-valve, which thereby also closes the ports 28 leading from the train-pipe. In this position also the train-pipe pressure lifts valve 15 and permits air to pass directly via the passage 13 and the chamber 5 to the auxiliary-reservoir until the pressures in the train-pipe and the auxiliary-reservoir are very nearly equalized, at which time the spring-pressed valve 15 is closed and final equalization of train-pipe and auxiliary-reservoir pressures takes place via ports 11 and 12. By this means the auxiliary-reservoir is instantly charged to very nearly train-pipe pressure, only the final modicum of air passing via leak-in ports 11 and 12.

*Service applications.*—When air is to be admitted to the brake-cylinder for ordinary service applications of the brakes, the engineer reduces the pressure in the train-pipe in the usual manner for this purpose, and the piston 7 shifts from right to left, as shown in the drawings, from the position shown in Fig. 1 to that shown in Fig. 2. As this movement occurs, the pin 23 on the piston-stem picks up the release-valve 35 and shifts it from the position shown in Fig. 1 to the position shown in Fig. 2, thereby closing communication between the brake-cylinder and the atmosphere. In making this movement, the port 33 leading from the train-pipe is momentarily placed in communication with the atmosphere, but the movement is effected so quickly and the port 35 is so restricted in character that but a very small amount of air passes from the train-pipe to the atmosphere, and the continued movement of the valve 35 to service position, shown in Fig. 2, results in the disconnection of said port 33 from the atmosphere, this port being closed by the release-valve 35, as shown in Fig. 2. During the last part of this movement of the piston the pin 23 picks up the graduating-valve 19 and lifts it from its seat. It will be observed that in this position train-pipe air is flowing in restricted quantities via the passage 26 and the ports 28 to the brake-cylinder, while auxiliary-reservoir air is flowing, but not in full volume, via the passage 18 to the brake-cylinder. The parts will remain in this position until the pressure on the auxiliary-reservoir side of the piston 7 has been reduced slightly below that of the air on the train-pipe side of said piston, when the piston will move slightly toward the auxiliary-reservoir and seat the graduating-valve. A further slight reduction of train-pipe pressure will cause this operation to be repeated, thereby effecting graduated charging of the brake-cylinder. The restricted venting of train-pipe air to the brake-cylinder via passage 26 thus secured will be sufficient to somewhat quicken the action of the several valves in the train, but will not be sufficient to effect an emergency application of the brakes by reason of the very slight reduction in train-pipe pressure due to this cause.

*Graduated release.*—With the parts in service position, being the position shown in Fig. 2 except that the graduating-valve has been moved to its seat so as to hold the brakes applied at the desired pressure, if it be desired to effect a graduated release of the brakes the engineer sniffs in a very small amount of air from the main-reservoir to the train-pipe by throwing his valve to release position and instantly throwing it to blank position. This movement will raise the train-pipe pressure enough to move the piston 7 from the service position to the position shown in Fig. 3, that is, nearly, but not quite, to full-release position, and during this movement the pin 23 picks up the release-valve 35 and shifts it from the position shown in Fig. 2 to the position shown in Fig. 3, that is, a position partially uncovering the port 32 and thereby affording a restricted passage from the brake-cylinder to the atmosphere. At the same time the train-pipe is placed in communication with the atmosphere via the passage 26, the annular groove 25, the port 33, the chamber 38 in the release-valve, the groove 37 in the top of the main-valve, and the exhaust-port 32 in said valve. By reason of the lowering of train-pipe pressure resulting from this venting of train-pipe air to the atmosphere through restricted port 33 the prompt return of the piston 7 from the graduated release position (shown in Fig. 3) to or toward service position is secured, thereby closing the passage from the brake-cylinder to the atmosphere via the port 32 and from the train-pipe to the atmosphere via the port 33. During the time, however, that the parts have occupied the position shown in Fig. 3, a portion of the pressure in the brake-cylinder has been released, and in case the engineer desires to still further release the braking pressure he again throws his engineer's-valve to release position and promptly shifts it to blank position, when the operation just described is repeated, thereby effecting an additional discharge of air from the brake-cylinder. This operation may be repeated until the brakes are entirely released. It will be seen that there is thereby secured a graduated or step-by-step release of the braking pressure in the brake-cylinder.

*Emergency.*—The emergency application of the brakes is secured by a large reduction of train-pipe pressure, thereby throwing the piston to the position shown in Fig. 4, in which position the train-pipe is placed in full and unrestricted communication with the brake-cylinder via the chamber 31 in the main-valve 30, the exhaust-ports are closed, and all communication between the train-pipe and the valve-chamber 5 and the atmosphere is cut off by the main-valve and the piston, while the graduating-valve is wide open. By this means the quick serial action of all the valves in the train is secured and the fullest possible amount of air is passed from the auxiliary reservoir to the brake-cylinder, and from the train-pipe to the brake-cylinder.

What is claimed is:—

1. In a triple valve for air-brakes, a valve-casing, a main-valve and a release-valve co-acting to control the venting of brake-cylinder air to the atmosphere, a graduating valve, a valve-operating piston for actuating said valves, said casing having a passage leading from the train-pipe side of said piston to the atmosphere and controlled by the co-action of said valves.

2. In a triple-valve for air-brakes, a main-valve through which brake-cylinder and train-pipe air is vented to the atmosphere, a release valve controlling the venting of both kinds of air, a graduating valve, and a valve-operating piston in operative relation with said valves and moving said valves one with relation to the other.

3. In a triple-valve for air-brakes, a main-valve through which brake-cylinder air is vented to the atmosphere, a release-valve controlling said venting action and capable of being moved to both restricted and full-release positions, a valve-operating motor device actuated by train-pipe pressure for imparting said movements to said release-valve, and means venting train-pipe air to the atmosphere while said release-valve is in its restricted-release position.

4. In a triple-valve for air-brakes, a graduating-valve a release-valve having non-release, full-release and restricted-release positions, a valve-operating piston operatively connected to both of said valves and operated by train-pipe pressure to move said release-valve from its non-release to its restricted or its full-release positions, and means venting train-pipe air to the atmosphere when said release-valve is in its restricted-release position.

5. In a triple-valve for air-brakes, a main-valve through which brake-cylinder air is vented to the atmosphere, a release-valve co-operating with said main-valve and having non-release, full-release and restricted-release positions with relation thereto, a graduating-valve independent of said main and release-valves, a valve-operating piston in operative relation with all three of said valves, and means venting train-pipe air to the atmosphere when said release valve is in its restricted-release position.

6. In a triple-valve for air-brakes, a main-valve having a port communicating with the atmosphere, a port communicating with the brake-cylinder and a port communicating with the train-pipe, a release-valve having a non-release, a full-release and a restricted-release position and connecting the brake-cylinder and train-pipe ports with the atmosphere port in its restricted-release position, the brake-cylinder port with the atmosphere port in its full-release position, and wholly disconnecting all three of said ports in its non-release position, and a valve-operating piston in operative relation with said valves.

7. In a triple-valve for air-brakes, a main-valve having a port communicating with the atmosphere, a port communicating with the brake-cylinder and a port communicating with the train-pipe, a release-valve having a non-release, a full-release and a restricted-release position and connecting the brake-cylinder and train-pipe ports with the atmosphere port in its restricted-release position, the brake-cylinder port with the atmosphere port in its full-release position, and wholly disconnecting all three of said ports in its non-release position, a graduating-valve independent of the main-valve, and a valve-operating piston in operative relation with said valves.

8. In a triple-valve for air-brakes, a main-valve through which brake-cylinder air is vented to the atmosphere to release the brakes and train-pipe air is vented to the brake-cylinder on emergency application of the brakes, and through which train-pipe air passes to the atmosphere when the parts are moving to position for a service-application of the brakes, a release-valve controlling the said venting of brake-cylinder and train-pipe air to the atmosphere, a graduating valve independent of said main and release-valves, and a piston operatively connected to all three valves.

9. In a triple-valve for air-brakes, a main-valve through which brake-cylinder and train-pipe air may pass to the atmosphere, a release-valve having a non-release, a full-release and a restricted-release position with relation to brake-cylinder air and permitting train-pipe air to pass to the atmosphere when said release-valve is in restricted-release position, and a piston operatively connected to said release-valve and operated by train-pipe pressure to move said release-valve from non-release to restricted release-position.

10. In a triple-valve for air-brakes, a main-valve through which brake-cylinder and train-pipe air may pass to the atmosphere, a release valve having a non-release, a full-release and a restricted-release position with relation to brake-cylinder air and permitting train-pipe air to pass to the atmosphere when said release-valve is in restricted-release position, and a piston operatively connected to said release-valve and operated by train-pipe pressure to move said release-valve from non-release to restricted-release position, and by auxiliary-reservoir air to move said release-valve from its full-release and its restricted-release positions to its non-release position.

11. In a triple-valve for air-brakes, a valve-casing having passages through which train-pipe air passes to the brake-cylinder on emergency and service applications, to the atmosphere and the brake-cylinder on service applications, and to the atmosphere on graduated-release of the brakes, a main-valve, a release-valve, and a graduating-valve controlling said passages, and a piston operatively connected to said valves.

In testimony whereof I have signed this specification in the presence of two subscribing witnesses.

WILLIAM BRAYTON MANN.

Witnesses:
AUGUSTUS W. BRADFORD,
JOHN B. MCGRAW.